UNITED STATES PATENT OFFICE.

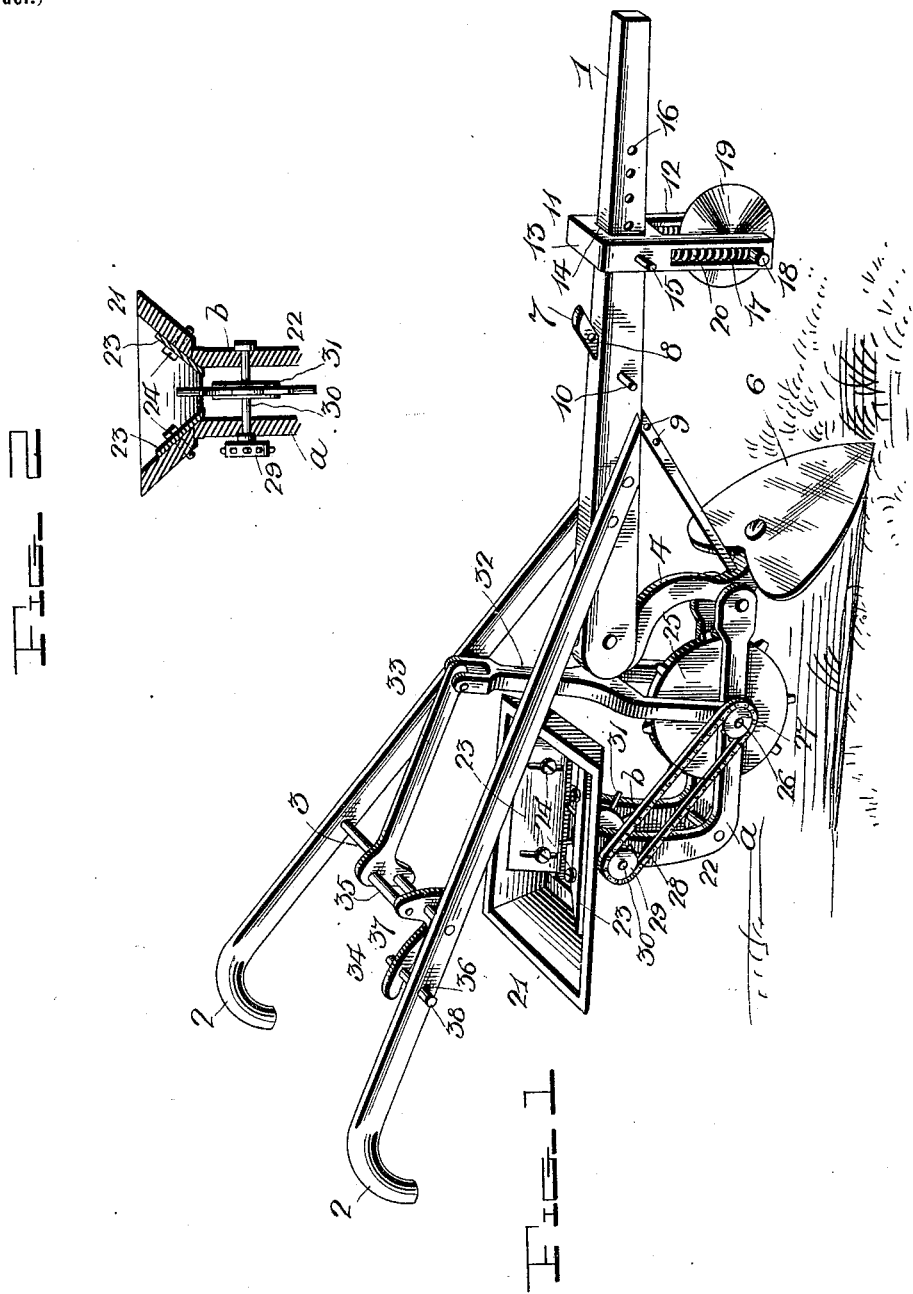

ANTHONY ASMORE, OF ALEXANDERVILLE, GEORGIA.

COMBINED PLOW AND FERTILIZER-DISTRIBUTER.

SPECIFICATION forming part of Letters Patent No. 658,936, dated October 2, 1900.

Application filed February 6, 1900. Serial No. 4,192. (No model.)

*To all whom it may concern:*

Be it known that I, ANTHONY ASMORE, a citizen of the United States, residing at Alexanderville, in the county of Echols and State of Georgia, have invented certain new and useful Improvements in a Combined Plow and Fertilizer-Distributer; and I do declare the following to be a full, clear, and exact description of the invention, such as will enable others skilled in the art to which it appertains to make and use the same.

The invention relates to a combined plow and fertilizer-distributer, and, as the title implies, contemplates the combining of a plow and a fertilizer-distributer, whereby the two operations—plowing and fertilizing—may be performed simultaneously.

The object of the invention is to provide a machine of this character which shall be simple of construction, durable in use, and comparatively inexpensive of production and which will perform its work in an efficient manner.

In the accompanying drawings, Figure 1 is a perspective view of my combined plow and fertilizer-distributer, the top of the seedbox being removed. Fig. 2 is a vertical sectional view through the seedbox and stirrer-wheel.

In the drawings the same reference characters indicate the same parts of the device.

Referring to said drawings, 1 denotes the plow-beam, and 2 its handles, provided with the usual cross-bar or round 3.

4 denotes the plow stock or standard, pivoted to the rear end of the plow-beam and provided with a shovel 6, the depth of penetration of which is regulated by a brace 7, extending through an aperture 8 in the plow-beam and provided with a vertical row of perforations 9 to receive a pin 10, which passes through an aperture in the side of the plow-beam.

11 denotes a colter-frame secured to the plow-beam in advance of the shovel. This colter consists of a bifurcated frame 12, having in its head 13 an aperture 14 to take the plow-beam. A pin 15 extends through the head and is adapted to engage in one of a horizontal row of apertures 16 in the plow-beam. The arms of the bifurcated frame are provided with alined slots 17, in which is vertically movable the axis 18 of a rotary colter 19, the said colter being forced to its work by coil-springs 20, which will permit of the colter rising without injury to itself should it come in contact with a rock or other impenetrable obstruction.

21 denotes the hopper of the fertilizer-distributer, and 22 denotes the hopper-standard, which consists of the two parts $a\,b$, which extend downwardly from the bottom of the hopper and thence parallel and forwardly and have their extremities pivoted to the plow stock or standard. The hopper has a slot in its bottom, and arranged within the hopper are blades 23, made adjustable by set-screws 24 to vary the discharge of the guano through the slot in the bottom of said hopper.

25 denotes a traction-wheel, the axle 26 of which is journaled between the horizontal parallel parts of the hopper-standard. A sprocket-wheel 27 is fixed to one end of said axle and is connected by a sprocket-chain 28 to a similar sprocket-wheel 29, fixed to a shaft 30, which carries a stirrer-wheel 31, the fingers of which project through the slot in the bottom of the hopper and agitate or stir the fertilizer therein to permit of its free discharge from the hopper.

32 denotes a forked bar, the lower end of which is pivoted to the horizontal parts of the hopper-standard and the upper end of which is pivoted to a lever 33, the rear end of which is pivoted on the cross-bar or round 3. A bell-crank lever 34 is also pivoted to this cross-bar 3 and has a transverse bolt 35 connecting it with the lever 33.

One of the plow-handles is provided with an aperture 36, and the handle of the bell-crank lever is provided with a similar aperture 37 to receive a pin 38, which is used for elevating the fertilizer-hopper and raising its traction-wheel out of engagement with the ground when it is not desired to fertilize.

As the device is drawn along the furrow is opened and the fertilizer distributed therein by reason of the traction-wheel coming in contact with the ground and rotating the stirrer through the intermediate sprocket-chain gearing. At the end of a row the operator without removing his hands from the handles of the plow may, with his thumb depress the free end of the bell-crank lever and by so doing will elevate the traction-wheel of the fertilizer-distributer from engagement with the ground, so that he may make a turn without losing any fertilizer.

If it be desired not to use the fertilizer at all, but simply to plow the ground, the fertilizer-hopper may be held, with its traction-wheel, free from contact with the ground by the pin 38.

From the foregoing description, taken in connection with the accompanying drawings, the construction, operation, and advantages of my improved combined plow and fertilizer-distributer will be readily apparent without requiring an extended explanation. It will be seen that the device is simple, that its construction permits of its manufacture at a comparatively-small cost, and that it is exceedingly well adapted for the purposes for which it is designed, and it will of course be understood that various changes in the form, proportion, and the minor details of construction may be resorted to without departing from the principle or sacrificing any of the advantages of this invention.

Having thus described the invention, what is claimed, and desired to be secured by Letters Patent, is—

In a combined plow and fertilizer-distributer, the combination with the plow-beam; of a standard pivoted thereto and provided with a shovel, the plow-handle bars secured to the beam and connected by a cross-bar, the fertilizer-distributer box having an opening in its bottom, the standards projecting downwardly from said bottom and horizontally and pivoted at their forward ends to the plow-standard, a traction-wheel pivoted to the distributer-standards, a stirrer journaled to said last-named standards and having fingers to work through the slot in the fertilizer-hopper, sprocket-wheels mounted upon the axes of the stirrer-wheel and traction-wheel, a sprocket-chain connecting the sprocket-wheels, a vertically-disposed bar pivoted to said last-named standards, a lever pivoted to the cross-bar connecting the plow-handles and to the upper end of the vertically-disposed bar, a bell-crank lever pivoted to said cross-bar, and fingers connected to the first-named lever, substantially as and for the purpose set forth.

In testimony whereof I have hereunto set my hand in presence of two subscribing witnesses.

ANTHONY ASMORE.

Witnesses:
   J. H. R. PARKER,
   JAMES G. HOGG.